United States Patent
Rutquist et al.

(10) Patent No.: US 8,332,090 B2
(45) Date of Patent: Dec. 11, 2012

(54) METHOD FOR OPERATING A HYBRID VEHICLE AND HYBRID VEHICLE

(75) Inventors: Per Rutquist, Freiburg im Breisgau (DE); Lisa Ehrlich, Mölnlycke (SE)

(73) Assignee: Volvo Technology Corporation, Göteborg (SE)

( * ) Notice: Subject to any disclaimer, the term of this patent is extended or adjusted under 35 U.S.C. 154(b) by 179 days.

(21) Appl. No.: 12/866,199

(22) PCT Filed: Feb. 8, 2008

(86) PCT No.: PCT/SE2008/000108
§ 371 (c)(1),
(2), (4) Date: Aug. 31, 2010

(87) PCT Pub. No.: WO2009/099354
PCT Pub. Date: Aug. 13, 2009

(65) Prior Publication Data
US 2011/0004365 A1 Jan. 6, 2011

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl. .............................. 701/22; 701/66

(58) Field of Classification Search .............. 271/22, 271/51, 58; 701/21, 51, 58, 66
See application file for complete search history.

(56) References Cited

U.S. PATENT DOCUMENTS

| 6,356,818 | B1 * | 3/2002 | Wakashiro et al. ............. 701/22 |
| 6,377,883 | B1 * | 4/2002 | Shimabukuro et al. ......... 701/51 |
| 7,131,510 | B2 * | 11/2006 | Mesiti et al. ............... 180/65.25 |
| 7,481,738 | B2 * | 1/2009 | Kanafani et al. ............... 477/110 |
| 7,841,433 | B2 * | 11/2010 | Soliman et al. .......... 180/65.265 |
| 7,908,067 | B2 * | 3/2011 | Soliman et al. ................. 701/54 |
| 8,010,264 | B2 * | 8/2011 | Ogata et al. ..................... 701/55 |
| 8,126,622 | B2 * | 2/2012 | Imamura et al. ................ 701/51 |
| 2005/0119805 | A1 * | 6/2005 | Bischoff ......................... 701/22 |
| 2007/0216312 | A1 * | 9/2007 | Ogata et al. .................... 315/131 |

(Continued)

FOREIGN PATENT DOCUMENTS

DE  102005049458 A1  4/2007

(Continued)

OTHER PUBLICATIONS

International Search Report for corresponding International Application PCT/SE2008/000108.

(Continued)

*Primary Examiner* — Prasad Gokhale
(74) *Attorney, Agent, or Firm* — WRB-IP LLP

(57) ABSTRACT

A hybrid vehicle and a method for operating a hybrid vehicle are provided, the vehicle including at least a first drive unit and a second drive unit coupled to the first drive unit, wherein the second driving unit recovers kinetic energy during braking the hybrid vehicle, a transmission unit which can be coupled to the first and/or second drive unit and a drive axle. It is proposed to change the transmission ratio of the transmission unit depending on a desired amount of energy recovered by the second drive unit during regenerative braking or a predetermined time period before the anticipated start of regenerative braking.

20 Claims, 3 Drawing Sheets

U.S. PATENT DOCUMENTS

2008/0185199 A1* 8/2008 Kimura et al. ............... 180/65.2
2011/0288703 A1* 11/2011 Falkenstein et al. ............ 701/22
2011/0301793 A1* 12/2011 Hsieh et al. ..................... 701/22

FOREIGN PATENT DOCUMENTS

| DE | 102005054614 A1 | 5/2007 |
|---|---|---|
| EP | 0808735 A1 | 11/1997 |
| EP | 1232895 A2 | 8/2002 |
| EP | 1291219 A2 | 3/2003 |
| EP | 1800985 A2 | 6/2007 |

OTHER PUBLICATIONS

International Preliminary Report on Patentability for corresponding International Application PCT/SE2008/000108.

Supplementary European Search Report for corresponding European App. EP 08 71 2706, Mar. 17, 2011.

* cited by examiner

METHOD FOR OPERATING A HYBRID VEHICLE AND HYBRID VEHICLE

BACKGROUND AND SUMMARY

The invention relates to a method for operating a hybrid vehicle and a hybrid vehicle according to the independent claims.

Hybrid vehicles with a multitude of drive units, e.g. a combustion engine and an electric machine coupled to the combustion engine are known in the art. When a hybrid vehicle decelerates, kinetic energy can be recovered by operating the electric machine as a generator and storing the recovered energy in a storage device, e.g. a battery, a super capacitor or the like. The electric machine can be used for a stop-start operation mode of the vehicle. U.S. Pat. No. 7,131,510 B2 discloses a stop-start operation mode of a hybrid vehicle. During a stop stage, the internal combustion engine is disconnected from the electric machine as well as from the transmission system and switched off. In a subsequent start stage, the engine is automatically restarted by the electric machine, which is now operated as a motor, and reconnected to the transmission system. The transmission system is shifted to a predetermined gear during the start stage.

It is desirable to provide a method for operating a hybrid vehicle which allows for improving the recovery of kinetic energy. It is also desirable to provide a hybrid vehicle providing an efficient energy recovery.

A method for operating a hybrid vehicle is proposed, said vehicle comprising at least a first drive unit and a second drive unit coupled to the first drive unit, wherein the second driving unit can recover kinetic energy of the hybrid vehicle, and a transmission unit which can be coupled to the first and/or second drive unit for driving a drive axle.

It is proposed to change the transmission ratio of the transmission unit depending on a desired amount of energy recovered by the second drive unit during regenerative braking or a predetermined time period before the anticipated start of regenerative braking. While braking, the second drive unit is driven in a regenerative braking mode and transforms the vehicle's kinetic energy into a storable energy form which can be used for starting or boosting the combustion engine, e.g. into electric energy stored in a battery or in a super capacitor or e.g. into kinetic energy of a flywheel.

Particularly, the first drive unit can be a combustion engine and second drive unit can be an electric machine which can be operated in a motor mode for driving the drive axle and/or the engine and a generator mode in which kinetic energy can be stored as electric energy when the drive axle drives the electric machine. Preferably the transmission unit can be an automated manual transmission or an automatic transmission.

The higher the rotational speed of the electric machine in the generator mode, the higher is the amount of energy recovered by the electric machine. By operating the electric machine at as high a rotational speed as possible, the energy recovery can be maximized. This can be done by using a low gear of the transmission unit, i.e. a high transmission ratio, during braking. However, the reverse is true for a combustion engine coupled to the transmission unit. A high gear results in lower losses of the engine while driving and a low gear results in higher losses. Advantageously, by using a low gear during braking, the electric machine can run at a higher rotational speed as during driving, when the gear is selected for an optimized operation of the engine. By increasing the transmission ratio, i.e. shifting to a lower gear, the amount of energy recovered during regenerative braking can be increased. By checking if the gear of the transmission unit can be reduced in favour of the rotational speed of the electric machine it can be avoided to start braking from a high gear which is favourable for reducing losses of the engine but reduces the energy recovery during regenerative braking when the electric machine is operated as generator.

Preferably it can be checked if the energy recovered by the second drive unit can be increased during braking by changing a transmission ratio of the transmission unit compared to an actual setting of the transmission unit and to change the transmission ratio if the energy recovered by the second drive unit can be increased. If the transmission ratio is already at its maximum, the ratio cannot be increased further However, if it is realized that increasing the transmission ratio is not favourable for the energy recovery of the second drive unit, a gearshift is omitted. For instance, if the lowest gear is already set, a change to a lower gear cannot be performed, or if the energy storage is full or nearly full it might not be desired to recover energy. In this case it might even be desirable to reduce the amount of energy recovered by the second drive unit by reducing the transmission ratio and shift to a higher gear. In a preferred alternative, even with a full energy storage a shift to a lower gear can be favourable as the higher rotational speed of an electric machine employed as second drive unit can improve the possibility to use one or both drive units for braking and thus reduce the wear on the disc brakes on the wheels It is advantageous if the change of the transmission ratio and/or a shut-down of the first drive unit can be initiated prior to braking the vehicle. Shut-down the first drive unit means to cut the fuel supply to the first drive unit and to decouple it from the drive axle, i.e. from the transmission unit and from the second drive unit, preferably by opening a clutch. In one preferred embodiment, the transmission ratio of the transmission unit between the second drive unit and the drive axle can be shifted to a value which is favourable for maximizing the energy recovery by the second drive unit, e.g. by performing a gear shift to a lower gear and thus increasing the rotational speed of an electric machine which is employed as second drive unit. Thus, braking the vehicle can actually start with a favourable transmission ratio, i.e. the gearshift to the desired low gear has been completed or is at least mostly completed and a time loss for energy recovery is minimized. For instance, if an electric machine is used as a second drive unit, no energy at all can be recovered by the electric machine during the time needed for a gearshift. By disengaging the first drive unit a higher transmission ratio can be used at a given speed, because the second drive unit, in case it is an electric machine, can operate at a higher rotational speed than the first drive unit in case the first drive unit is a combustion engine. The gear shifting can be accomplished simpler and faster when it is not necessary to synchronize the speed of the first drive unit. Thus, by an early shut-down of the first drive unit, a disadvantageous shifting of gears during regenerative braking can be avoided.

According to an advantageous method step, the shut-down of the first drive unit can be actively initiated by the driver. A skilled driver usually knows early enough when the vehicle has to be decelerated or stopped. In such cases, the driver can initiate the shutdown by activating an actuator prior to anticipated braking. For instance, the shut-down can be initiated a signal activated by a brake pedal, particularly by tapping the brake pedal before pressing the brake pedal continuously for actually braking the vehicle. In an appropriate drive mode of the vehicle, the tapping of the brake pedal can be identified as a request for initiating the shut-down. A skilled driver can do this well before the instant where an actual braking procedure begins, i.e. the shut-down of the first drive unit can be initiated e.g. at least 500 ms, preferably at least one second prior to braking. This results in energy savings not only by improved energy recovery by the second drive unit but also by an early stop of the first drive unit by cutting the fuel supply.

Additionally or alternatively, the shut-down of the first drive unit can be initiated by a signal activated by a switch operated by the driver. The switch can be an electronic switch or a mechanic switch and can have any form such as a push button, a sliding unit, a lever or the like. The switch can advantageously be arranged at the steering unit such as a steering wheel or a joy stick or the like and can preferably be activated by the driver's hand.

A gear of the transmission unit can be selected for braking. Preferably, the transmission unit can switch to a lower gear when the shut-down of the first drive unit is initiated, thus increasing the time during which an energy recovery is possible while braking the vehicle.

Preferably, the shut-down of the first drive unit can be initiated at least 500 ms prior to anticipated braking.

According to another favourable embodiment of the invention, additionally or alternatively a prediction value can provided for an estimated decision parameter of the hybrid vehicle, e.g. a speed-related parameter or the like. The decision parameter can also be a mathematical function listed variables, e.g. such as mass times speed. Preferably the transmission unit can shift to a lower gear if the prediction value yields the decision parameter beyond a predetermined limit. Such an estimated decision parameter can be for instance a duration of braking, a speed of the vehicle before and after braking, a mass of the vehicle, a slope of the road and the like. If e.g. the estimated duration is long or the change of speed is large, or e.g. the slope of the road is large, a shut-down of the first drive unit as well as a gearshift can be initialized early. It is also possible to combine such parameters for determining if a gearshift is desirable or not. This can be done automatically, without interference of the driver or in combination with a request for shutdown emitted by the driver prior to braking the vehicle, as described above.

Preferably, the transmission unit can shift to a higher transmission ratio, e.g. a lower gear, if the prediction value yields a parameter beyond a predetermined limit. By way of example, the predetermined limit can be a minimum time span. If braking is estimated to be longer than this time span, then it can be decided that changing the gear is desirable. In this case the vehicle will be decelerated to a lower velocity than it was driving before and/or the vehicle is moving downhill thus providing a large amount of kinetic energy for a considerable time which can be recovered and stored. If it can be foreseen that the vehicle will be braking for a long time or the speed change will be large, the gearshift can be done in an optimized way, preferably as early as possible. When the vehicle actually brakes the second drive unit can take full advantage of the braking phase and recover energy. In case a speed change is considered, the predetermined time span can be a minimum speed change. If the speed change is estimated to be larger, then a gearshift can be assumed to be desirable. If the road is inclined or the mass of the vehicle is large, the speed change as well as the duration of braking can be influenced by these parameters.

Particularly, the prediction value can be based on actual position data of the hybrid vehicle, e.g. a GPS system. For instance, if a road crossing is recognized or a parking area or an area with reduced speed or the actual road where the vehicle is driving on is declined, a braking process will most probably hold on for a longer time. The transmission ratio of the transmission unit can be set to a state which is favourable for energy recovery by the second drive unit.

The prediction value can alternatively or additionally be extracted from driving statistics of the hybrid vehicle. If a vehicle is frequently driving the same route and/or the vehicle is driven frequently by the same driver with a particular driving style, e.g. a sportive or a comfort style or braking early or braking late, the prediction value can be adjusted to the particular individual style.

According to another aspect of the invention, a hybrid vehicle is proposed comprising at least a first drive unit and a second drive unit coupled to the first drive unit, wherein the second driving unit recovers kinetic energy during braking the hybrid vehicle, a transmission unit which can be coupled to the first and/or second drive unit and a drive axle. It is proposed to provide a unit for changing the transmission ratio of the transmission unit depending on a desired amount of energy recovered by the second drive unit during regenerative braking. Preferably the first drive unit can be a combustion engine and the second drive unit can be an electric machine. If it is desired to maximize the energy recovery of the electric machine the transmission ratio can be increased. If it is desired to decrease the amount of recovered energy the transmission ratio can be decreased of maintained to the actual value.

Preferably, an actuator is provided for initiating the change of the transmission ratio and/or a shut-down of the first drive unit prior to braking the vehicle. If the amount of recovered energy during regenerative braking should be increased, it is favourable to perform the gearshift as early as possible in order to maximize the time span during which energy can be recovered.

Preferably, the actuator can be coupled to a brake pedal. In a driving mode, tapping on the brake pedal can be interpreted as a request for shut-down of the first drive unit before the driver presses the brake pedal for braking. Alternatively or additionally, the actuator is coupled to a push button accessible for a driver.

The transmission unit can favourably be arranged in the drive train between the second drive unit and driven wheels. The transmission unit can preferably be an automated manual transmission or an automatic transmission. The control algorithm for the transmission unit affects the amount of energy that is recovered by the second drive unit, e.g. by influencing the rotational speed of the second drive unit by providing a selected gear.

Preferably, a clutch can be provided between the first drive unit and the drive train. When a request for shut-down is emitted, the first drive unit can be shut off and decoupled from the drive train early thus saving energy by saving fuel.

Advantageously, a prediction unit can be provided for providing a prediction value of an estimated decision parameter, such as e.g. duration of braking, speed change and the like.

The prediction unit can be coupled to a position detecting system allowing for an estimation of a decision parameter of the vehicle, for instance a duration of a braking phase of the vehicle. Favourably, the prediction unit can be coupled to a data source providing driving statistics. Thus an estimation of the decision parameter can be adopted to an individual driver and/or a particular location of the vehicle.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

Figure 1:
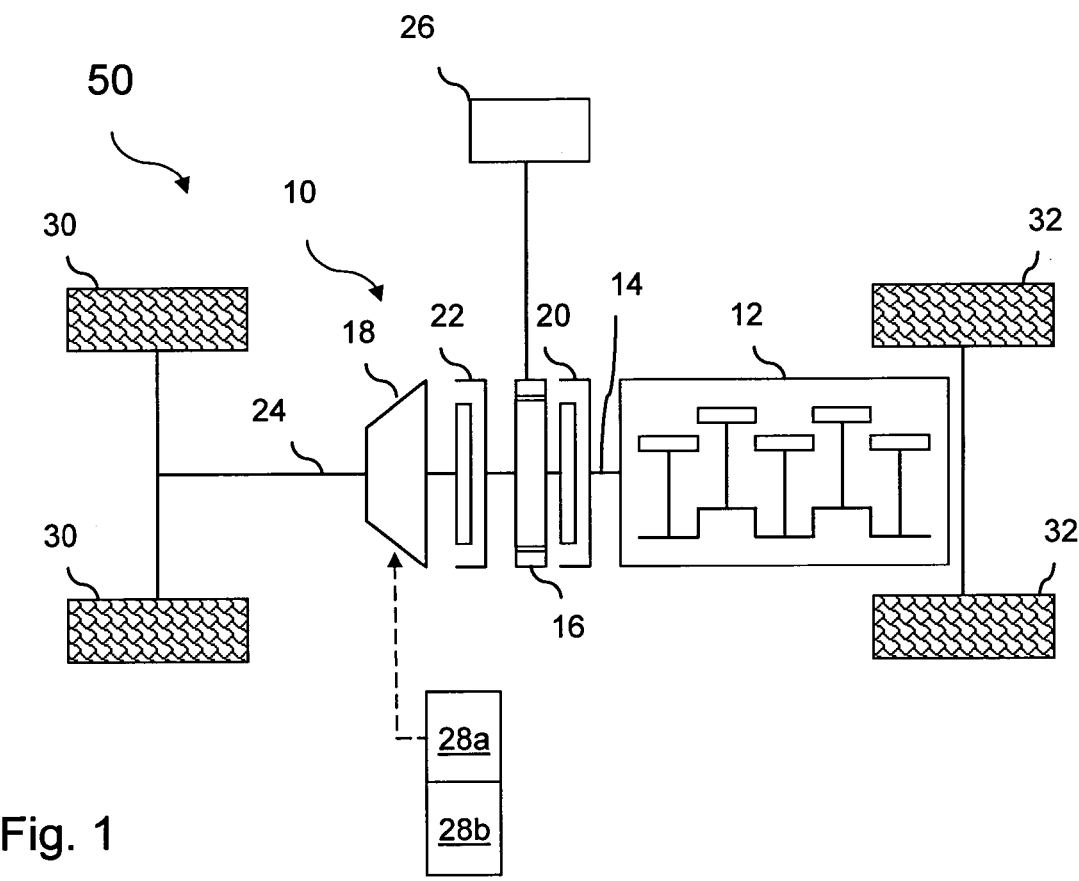
FIG. 1 a schematic view of a preferred hybrid vehicle according to the invention.

In the drawings, identical or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

FIG. 1 illustrates a schematic sketch of a preferred hybrid vehicle 50 according to the invention. The hybrid vehicle 50 comprises a drive train 10 with a first drive unit 12, preferably a combustion engine, and a second drive unit 16, preferably an electric machine, arranged on an output shaft 14 of the first drive unit 12. A transmission unit 18 can be coupled to the first and/or second drive unit 12, 16. Driveable wheels 30 are connected to the drive axle 24. Further wheels 32 of the hybrid vehicle can be non-driveable or driveable (four-wheel drive).

A first clutch 20 is arranged between the first and the second drive units 12, 16 and an optional second clutch 22 is arranged between the second drive unit 16 and the transmission unit 18. The transmission unit 18 can be an automated manual transmission or an automatic transmission controlled by a transmission control unit (not shown). If the first clutch 20 is open and the second clutch 22 closed, the second drive unit 16 can be driven by the driven wheels 30 via the drive axle 24. In case of an electric machine as second drive unit 16 the electric machine is in a generator mode and transforms kinetic energy into electric energy which is stored in a storage unit 26, e.g. a battery. If the first clutch 20 is closed and the optional second clutch 22 open, the second drive unit 16 can act as a starter motor and start the first drive unit 12 by turning the output shaft 14. Alternatively, if there is no second clutch 22, the transmission unit 18 can be in its neutral gear for starting the first drive unit 12 with the second drive unit 16. In this case, if the first clutch 20 is closed and the transmission unit 18 in its neutral state, the first and the second drive units 12 and 16 are decoupled from the rest of the drive train 10. Thus, the second drive unit 16 can start the first drive unit 12 by e.g. turning the output shaft 14 of the first drive unit 12.

A control unit 28a is provided for checking if transmission ratio of the transmission unit 18 should be increased or decreased during braking. Such a control unit 28a could for instance be a microprocessor. If the transmission ratio should be increased to increase the rotational speed of the second drive unit 16, the transmission ratio is changed by selecting an appropriate gear, particularly by choosing a lower gear than in the actual drive mode of the first drive unit 12. A prediction unit 28b is provided for estimating a decision parameter, e.g. the duration of braking of the hybrid vehicle 50. The units 28a, 28b can be integrated into a transmission unit controller which controls the usual functions of the transmission unit 18.

An actuator 40 is provided for initiating a shut-down of the first drive unit 12 prior to braking the vehicle 50. The actuator 40 can alternatively or additionally be coupled to a push button accessible for a driver (not shown) which can be activated by hand. As indicated by way of example in FIG. 2 the actuator 40 can be coupled to a brake pedal.

The driver can send a request for shut-down of the first drive unit 12 by tapping the brake pedal before the effective braking procedure begins. The first drive unit 12 is shut off, e.g. by cutting-off the fuel supply, and decoupled from the drive train 10 by opening the first clutch 20. The second clutch 22 between the transmission unit 18 and the second drive unit 16 is closed so that the drive axle 24 drives the second drive unit 16 which recovers kinetic energy of the decelerating vehicle 50.

In case there is no second clutch 22 the first drive unit 12 is shut off, e.g. by cutting-off the fuel supply, and decoupled from the drive train 10 by opening the first clutch 20. The second drive unit 16 is now fixedly coupled to the transmission unit 18 as there is no second clutch 22 and the drive axle 24 drives the second drive unit 16 which recovers kinetic energy of the vehicle 50.

Figure 2:
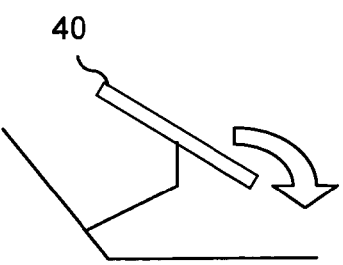
FIG. 2 a brake pedal used as preferred actuator for requesting a shut-down of a first drive unit according to the invention.
Figure 3:
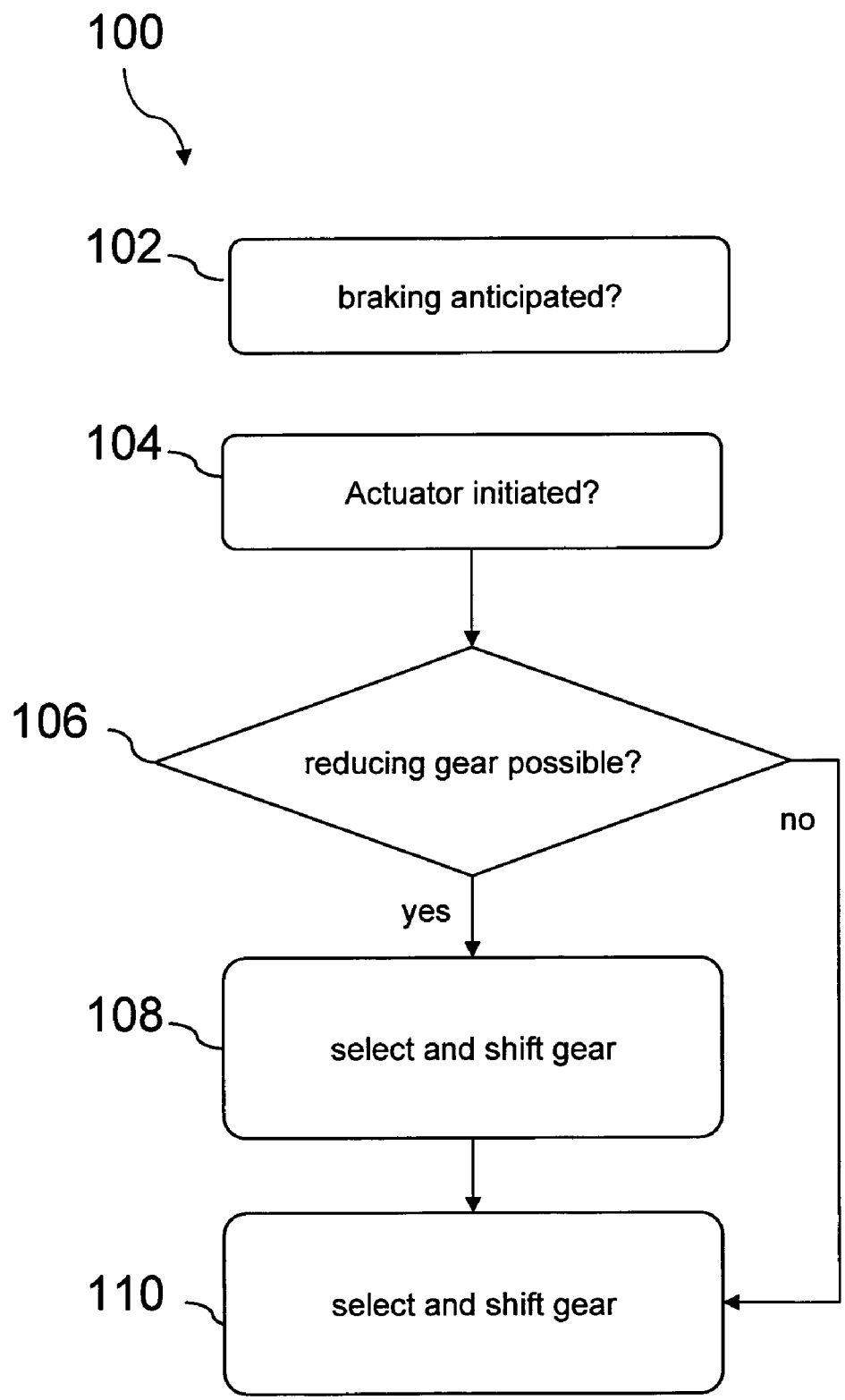
FIG. 3 a flow chart according to a first preferred operating method according to the invention.

Referring now to FIG. 3 in view of the FIGS. 1 and 2, a flow chart 100 depicts a first preferred method according to the invention for operating a hybrid vehicle 50 when the amount of recovered energy during regenerative braking should be increased. According to this embodiment, if braking is anticipated in step 102 a short time before actually braking, the shut-down of the first drive unit 12 can be initiated by the driver in step 104 when the driver becomes aware of a need to brake the vehicle 50. The driver initiates the shut-down of the first drive unit 12 by e.g. tapping an actuator 40 embodied as brake pedal (FIG. 2). On sending this request for shut-down of the first drive unit 12 it is checked in step 106, e.g. by the control unit 28a, if a gear shift is possible, e.g. a lower gear can be chosen in the transmission unit 18. If it is not possible to shift to a lower gear, the driver is ready without gearshift in step 110 and can brake or cruise. If it is possible to shift to a lower gear, a lower gear is selected and applied in step 108. By performing a gearshift to a lower gear, the rotational speed of the second drive unit 16 increases due to the increased transmission ratio of the lower gear. Preferably a lower gear is selected which allows the second drive unit 16 to rotate with a higher speed than in the normal drive mode of the first drive unit 12 and thus allows to recover the kinetic energy more efficiently.

The gearshift is favourably initiated as soon as possible after the driver's request to shutdown the first drive unit 12. Therefore, the gearshift is completed or at least almost completed when the driver starts to press the brake pedal for brake the vehicle after ready in step 110. A skilled driver can typically request for such a shut-down of the first drive unit 12 at least 500 ms before the actual braking begins. For example, the driver might initiate the shut-down of the first drive unit 12 about one second or a few seconds before braking. If a gearshift requires or is at least almost completed after about 500 ms, then there will be at least another 500 ms of coasting before braking begins. The actual time of a gearshift might vary depending on the type of gearbox, the particular gears that are shifted between and the torques applied prior to and after braking. It may take over two seconds in worst case.

If a shift to a lower gear is not desired but to a higher gear to reduce the amount of energy during regenerative braking, the gearshift to a higher gear could be performed in step 108.

Figure 4:
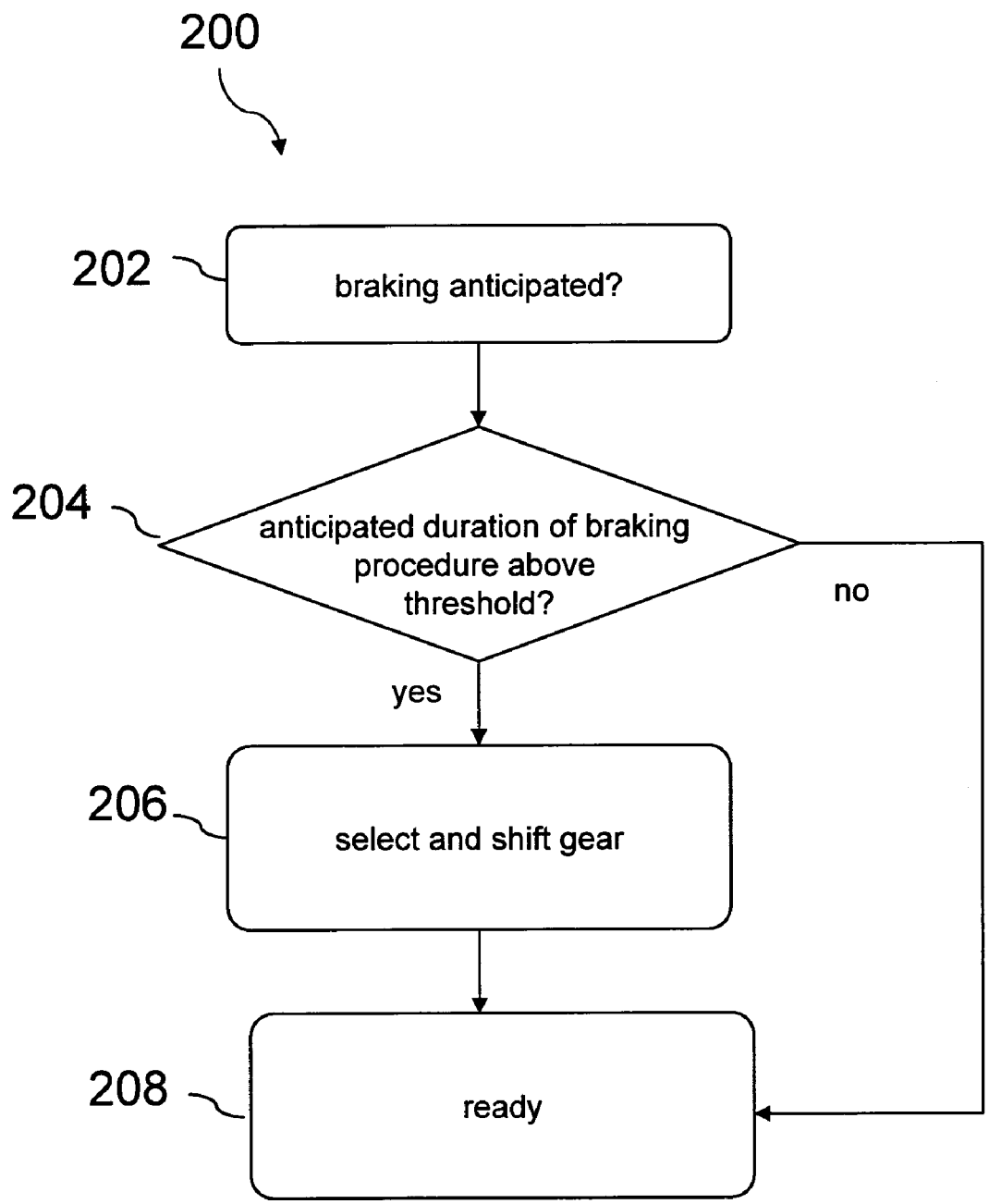
FIG. 4 a flow chart according to a second preferred operating method according to the invention.

Referring to FIG. 4 in view of FIGS. 1 and 2 a flow chart 200 according to a second preferred method according to the invention for operating a hybrid vehicle 50 is described. According to this embodiment, in the course of a braking action, if braking is anticipated (step 202) and it can be predicted that braking will be sustained for a longer period of time (step 204) then a gearshift is done in an optimal way, preferably as soon as possible. A prediction value can be provided for an estimation of a decision parameter, e.g. a duration of braking of the hybrid vehicle 50 in a database coupled to the prediction unit 28b coupled, e.g. via the control unit 28a to the transmission unit 18.

A lower gear is chosen and shifted to in step 206. If no gear shift is possible, e.g. when the lowest gear is already applied, the vehicle brakes without gearshift after the ready step 208. For example, the driver might initiate the shut-down of the first drive unit 12 one second or a few seconds before braking. If a gearshift would require e.g. about 500 ms, then there would be at least another 500 ms of coasting before braking begins or for using the second drive unit 16, e.g. the electric machine, to drive the vehicle before braking.

The prediction of the decision parameter, e.g. the duration of braking and/or the change of speed, can be made based on information of a map and/or a positioning system such as GPS or by using driving statistics of the vehicle 50 and/or the driver. The lower gear allows the second drive unit 16 to work at a higher rotational speed which increases the amount of recovered energy.

The gearshift is favourably initiated as soon as possible after the driver's request to shutdown the first drive unit 12. Therefore, the gearshift is completed or at least almost completed when the actual braking begins. The gearshift can be initiated without a driver's interference or in combination with the operating method described in FIG. 3. If, however, a gearshift to a lower gear is not desired but a shift to a higher gear should be desired, this gearshift can be performed in step 206.

The invention allows for efficiently recovering kinetic energy of a hybrid vehicle 50 during regenerative braking by establishing a high rotational speed of the electric machine, i.e. the second drive unit 16. Further it is possible to reduce fuel consumption of a combustion engine, i.e. the first drive unit 12 by initiating a shut-down early even before braking the vehicle 50. Another advantage is reduced wear on the disc brakes of the vehicle's wheels. The second drive unit 16 can absorb more torque that would otherwise have been put in the brakes of the wheels.

The invention claimed is:

1. A method for operating a hybrid vehicle comprising at least a first drive unit and a second drive unit coupled to the first drive unit, wherein the second driving unit recovers kinetic energy during braking the hybrid vehicle, a transmission unit which can be coupled to the first and second drive unit and a drive axle, characterized by changing the transmission ratio of the transmission unit depending on a desired amount of energy recovered by the second drive unit during regenerative braking or by changing the transmission ratio a predetermined time period before the anticipated start of regenerative braking, wherein the change of the transmission ratio is initiated prior to braking the vehicle.

2. The method according to claim 1, comprising increasing the transmission ratio if it is desired to increase the energy recovered by the second drive unit.

3. The method according to claim 1, comprising decreasing the transmission ratio if it is desired to decrease the energy recovered by the second drive unit.

4. The method according to claim 1, wherein a shutdown of the first drive unit is initiated prior to braking the vehicle.

5. The method according to claim 4, wherein the shut-down of the first drive unit is actively initiated by a driver.

6. The method according to claim 5, wherein the shut-down of the first drive unit is initiated by activating an actuator.

7. The method according to claim 5, wherein the shut-down of the first drive unit is initiated by a signal activated by a brake pedal and by a switch operated by the driver.

8. The method according to claim 1, wherein the shut-down of the first drive unit is initiated at least 500 milliseconds prior to anticipated braking.

9. The method according to claim 1, wherein a prediction value is provided for an estimated decision parameter of the hybrid vehicle, particularly a prediction value for an estimated duration of braking of the hybrid vehicle.

10. The method according to claim 9, wherein the transmission unit shifts to a lower gear if the prediction value yields the decision parameter beyond a predetermined limit, particularly if the prediction value for the duration of braking is above a predetermined limit.

11. The method according to claim 9, wherein the prediction value is based on actual position data and driving statistics of the hybrid vehicle.

12. A hybrid vehicle comprising at least a first drive unit and a second drive unit coupled to the first drive unit, wherein the second driving unit recovers kinetic energy during braking the hybrid vehicle, a transmission unit which can be coupled to the first and second drive unit and a drive axle, and a control unit for changing the transmission ratio of the transmission unit depending on a desired amount of energy recovered by the second drive unit during regenerative braking or changing the transmission ratio a predetermined time period before the anticipated start of regenerative braking, wherein an actuator is provided for initiating the change of the transmission ratio prior to braking the vehicle.

13. The vehicle according to claim 12, wherein an actuator is provided for initiating a shut-down of the first drive unit prior to braking the vehicle.

14. The vehicle according to claim 13, wherein the actuator is coupled to a brake pedal and to a switch accessible for a driver.

15. The vehicle according to claim 12, wherein a control unit is provided for checking if the energy recovered by the second drive unit can be increased during braking by changing a transmission ratio of the transmission unit and changing the transmission ratio if the energy recovered by the second drive unit can be increased.

16. The vehicle according to claim 12, wherein the transmission unit is arranged in the drive train between the second drive unit and driven wheels.

17. The vehicle according to claim 12, wherein the transmission unit is an automated manual transmission or an automatic transmission.

18. The vehicle according to claim 12, wherein at least one clutch is provided between the first drive unit and the drive train.

19. The vehicle according to claim 12, wherein a prediction unit is provided for providing a prediction value of an estimated decision parameter of the vehicle.

20. The vehicle according to claim 19, wherein the prediction unit is coupled to a position detecting system and to a data source providing driving statistics.

* * * * *